April 16, 1940. C. A. NICHOLS ET AL 2,197,191
METHOD AND APPARATUS FOR MAKING BRAZED TUBING
Filed April 2, 1938 7 Sheets-Sheet 1

INVENTORS
Charles A. Nichols and Raymond H. Bish
BY
Spencer Hardman & Fehr
their ATTORNEYS April 16, 1940. C. A. NICHOLS ET AL 2,197,191
METHOD AND APPARATUS FOR MAKING BRAZED TUBING
Filed April 2, 1938 7 Sheets-Sheet 2

INVENTORS
Charles A. Nichols and Raymond H. Bish
BY
Spencer Hardman & Fehr
their ATTORNEYS

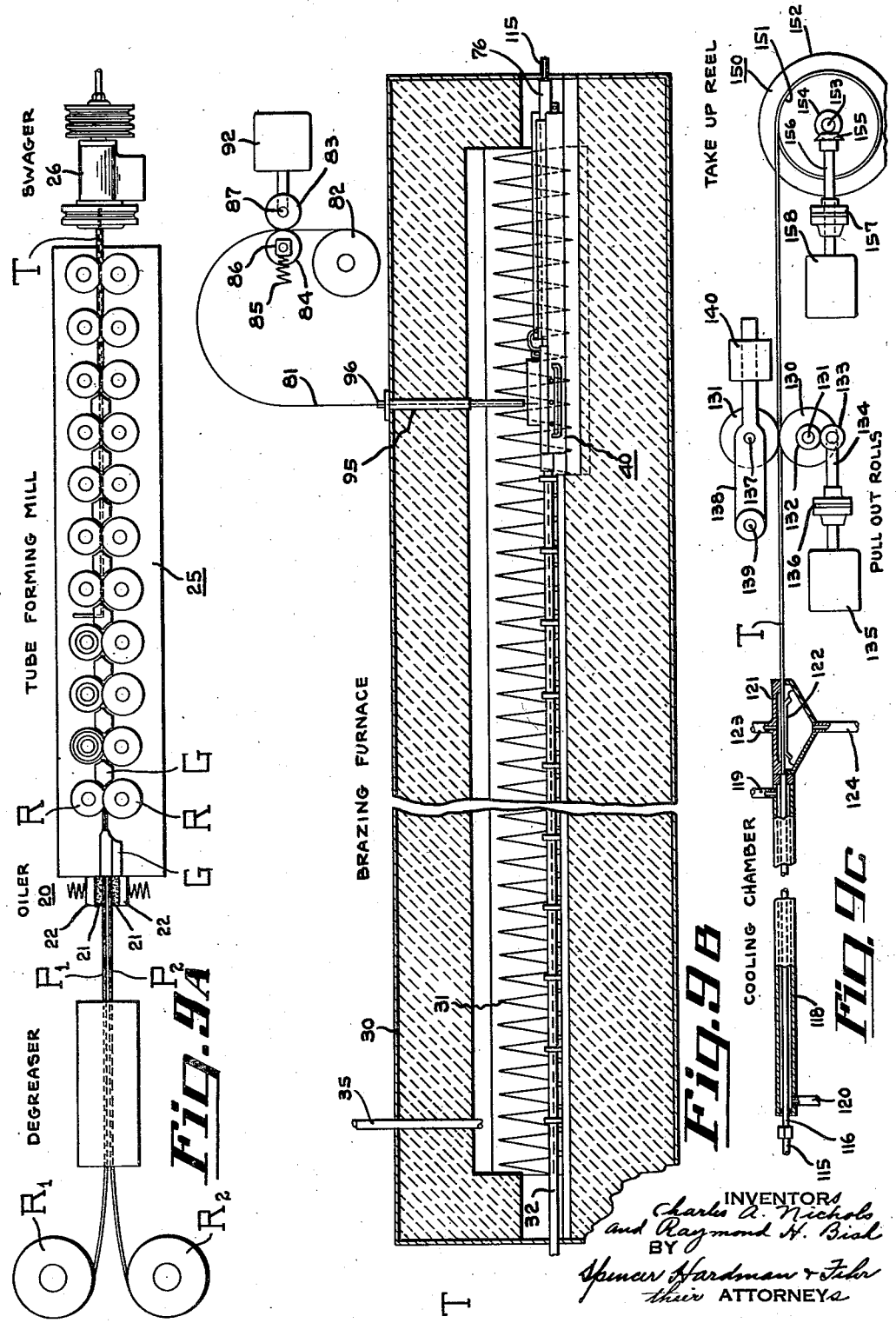

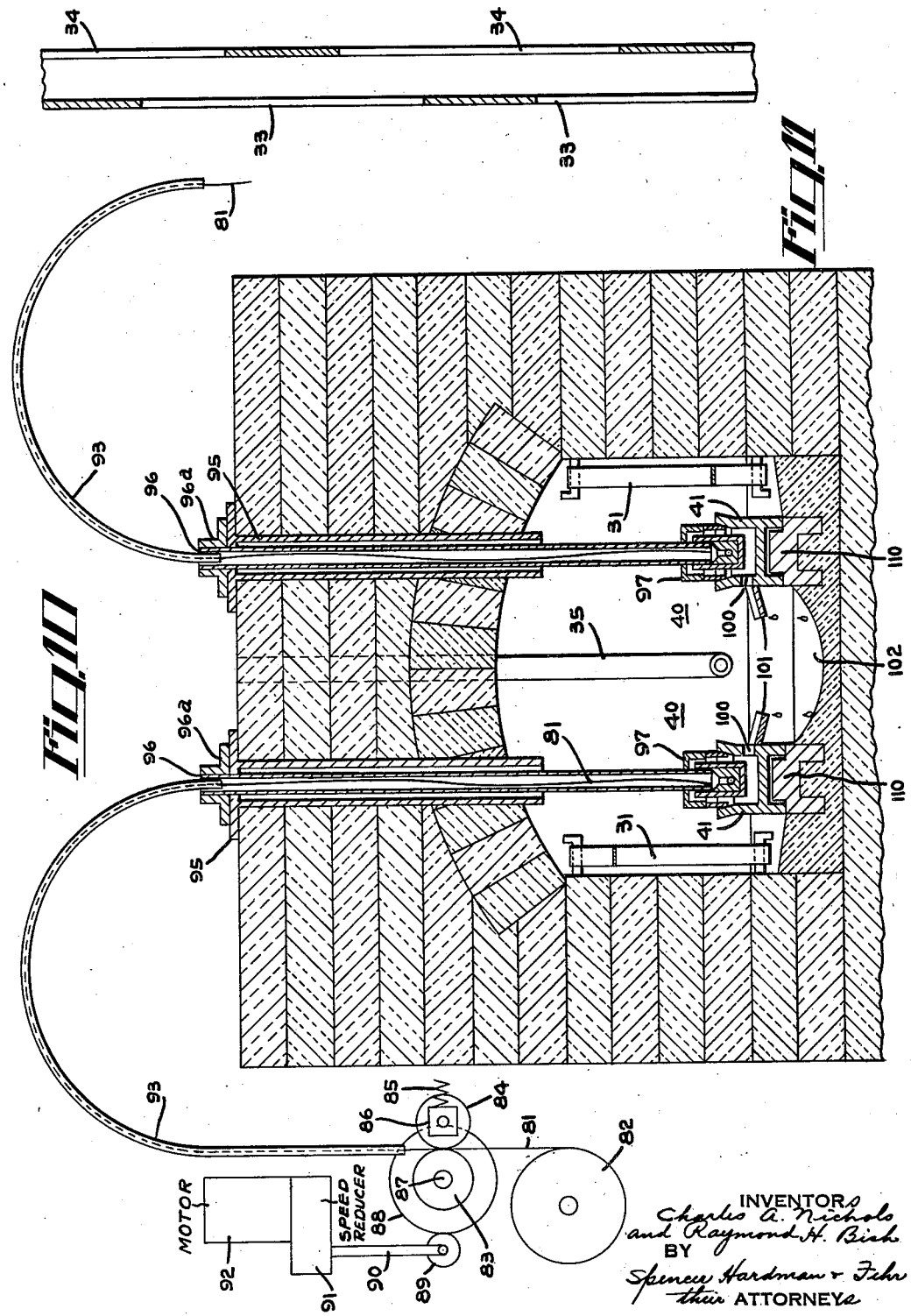

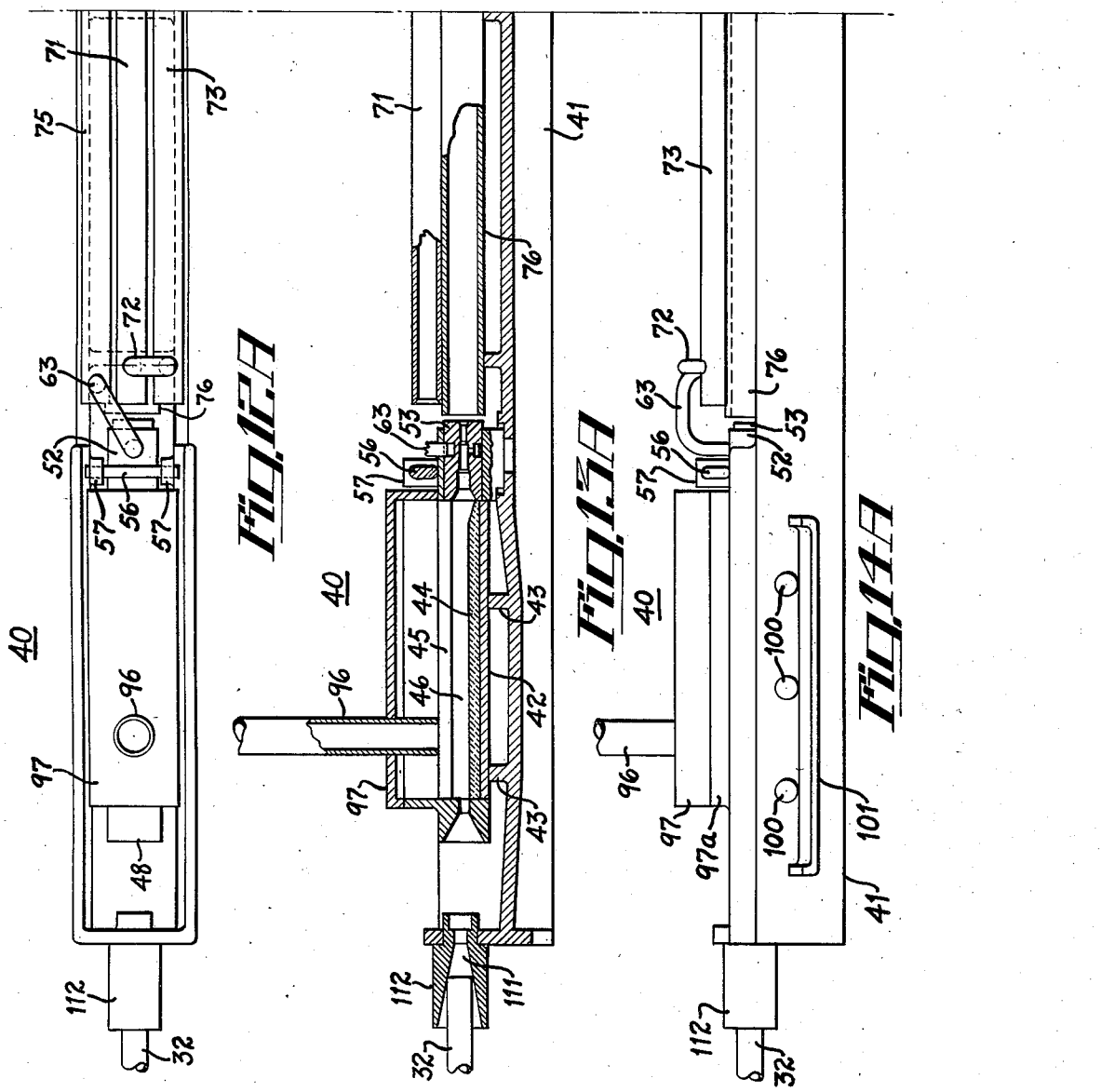

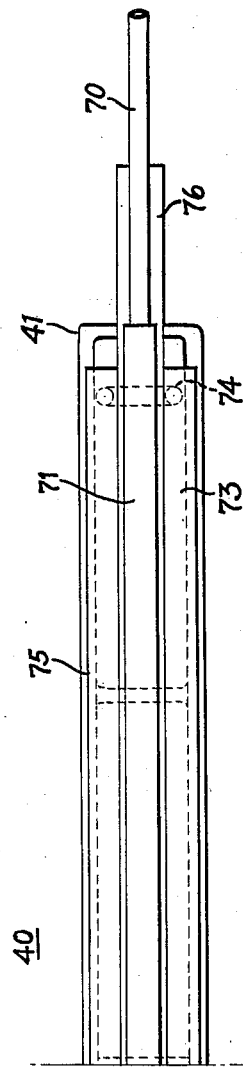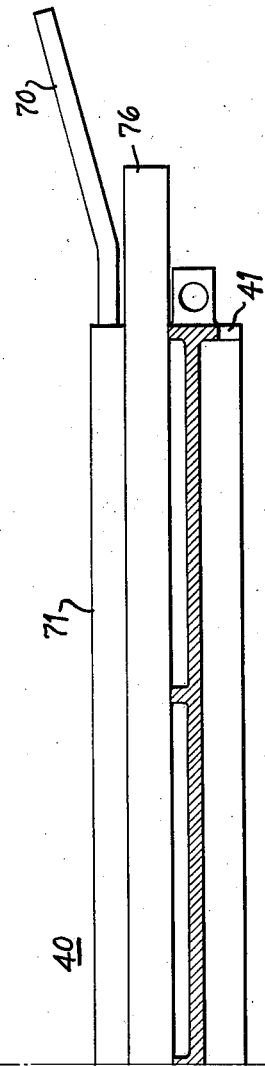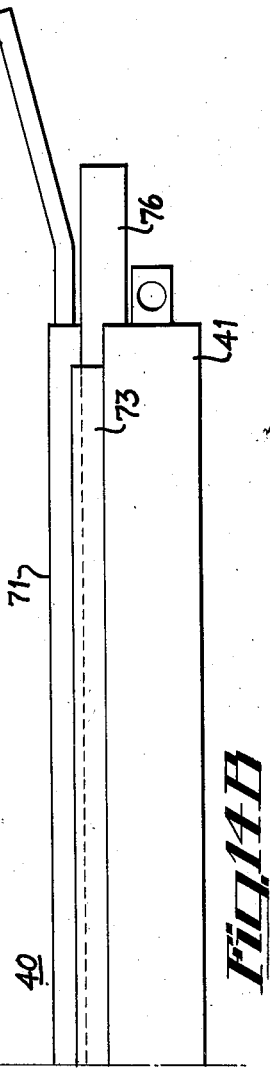

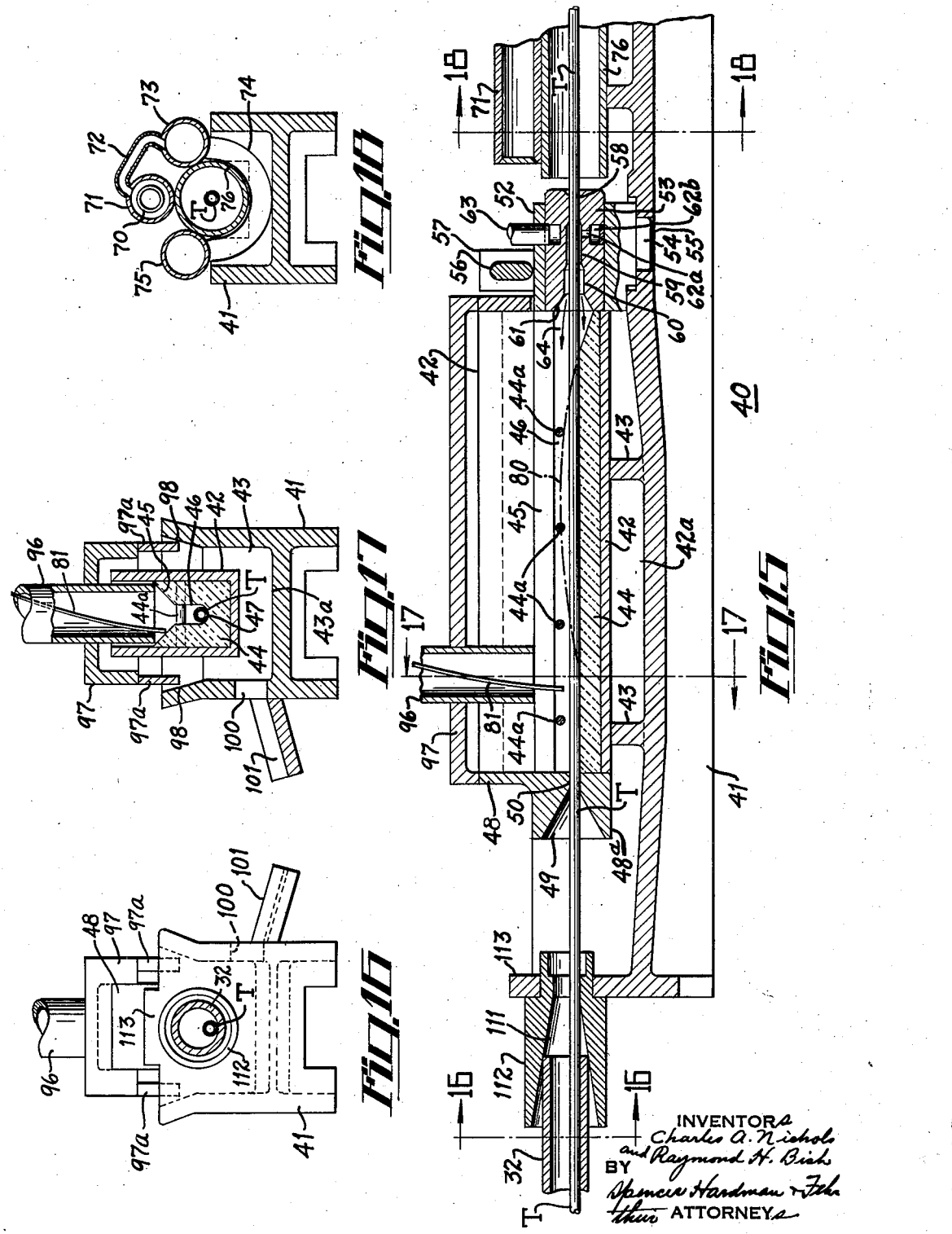

Patented Apr. 16, 1940

2,197,191

UNITED STATES PATENT OFFICE 2,197,191

METHOD AND APPARATUS FOR MAKING BRAZED TUBING

Charles A. Nichols and Raymond H. Bish, Anderson, Ind., assignors to General Motors Corporation, Detroit, Mich., a corporation of Delaware Application April 2, 1938, Serial No. 199,556

16 Claims. (Cl. 113—33)

This invention relates to the manufacture of multiply tubing formed from strip steel, the plies and seams of the tubing being bonded together by a suitable brazing material such as copper.

It is the aim and object of the present invention to provide a novel method and apparatus for making multi-ply, copper brazed tubing by continuous operation at speeds that have not been attained heretofore. In the production of multi-ply tubing by methods which have been practiced hitherto the principal factor which limits the speed of production is the brazing operation. The present invention aims particularly to increase the speed of the brazing operation. This object is accomplished by passing the formed tubing through an elongated electric furnace containing a non-oxidizing atmosphere and a bath of molten brazing material near its outlet. The brazing material is rendered molten by the heat of the furnace and is contained in a brazing trough through which the tubing passes. As the tubing passes through the furnace the temperature of the tubing is raised to a degree in excess of the melting point of the brazing material. The brazing material very quickly penetrates between the seams and plies of the tubing since the plies of the tubing have been very closely compacted together by a swaging operation thus providing narrow passages into which the brazing material is quickly absorbed by capillary attraction. Copper is a satisfactory brazing material since, while molten, it is very quickly absorbed into the minute passages between the plies and seams of the tubing.

As the tubing passes through the bath of copper there is a tendency for some of the copper to cling to the tube. If this copper were allowed to freeze on the tubing, a bumpy, uneven appearance would result, thereby destroying the saleability of the tubing. Furthermore such a coating as would naturally be formed upon the exterior of the tube is so irregular and thin in places as to be valueless as a protective coating. It is therefore an object of the invention to remove as much as possible of the copper from the exterior of the tubing before the copper freezes. This is accomplished by passing the tubing through a gas wiper which is an enveloping jet or blast of heated non-oxidizing gas issuing in a direction opposite to the movement of the tubing through the trough. The blast of gas not only wipes the excess copper from the exterior of the tubing but also causes the bath of copper in the trough to take the form of a wave which completely submerges the tubing in the trough. The wiper jet is provided by a nozzle which walls off the exit end of the brazing trough, hence this jet prevents the escape of molten copper from the exit end of the trough.

Preparatory to forming the tubing from strips of steel, that surface of a strip which forms the interior wall of the tubing is coated with a lubricant which will lubricate the mandrel over which the tubing is formed and which will also provide a film coating on the interior of the formed tubing. This film on the interior of the tubing breaks down into a gas while the tubing is being heated to the brazing temperature. This gas combines with the oxygen of the air on the inside of the tubing thereby preventing oxidation of the interior of the tubing during the brazing operation. There is a film of oil on the exterior of the tubing resulting from lubricating the outer ply to prevent galling of the rolls, and from passing through the heavily lubricated swager. This outer film gasifies as the tubing passes through the furnace. The presence of this gas around the exterior of the tube has been found to be detrimental since it has a carburizing effect. It is a further object of the present invention to allow this gas which is formed about the exterior of the tubing to mingle with the reducing gas of the furnace. Therefore, the tubing passes, while being heated, through the guide tube which is perforated to permit the gas introduced into the furnace to penetrate into the guide tube and to mingle with the gas which has formed about the exterior of the tubing.

The temperature of the furnace is such to heat the tubing quickly to brazing temperature before it passes through the brazing trough which contains the bath of copper. The material of this trough and the tray which supports it are subjected to relatively high temperatures, thereby causing the material of the trough and tray to disintegrate. The foregoing is true also of the gas wiper and the heating pipe through which gas is heated before passing to the gas wiper. Consequently it is a further object of the present invention to provide a unitary structure including the brazing trough, the trough supporting tray, gas wiper and wiper gas preheating duct, said unitary structure being removable from the brazing furnace and a new unit being substituted therefor without appreciably cooling down the furnace.

The bath of copper in the brazing trough is replenished by feeding through the top wall of the furnace a copper wire which is directed by a guide tube into the brazing trough. The end of this wire melts and descends along a side wall of the trough to the bottom thereof. To facilitate the removal of the brazing tray assembly unit provisions are made for easily disassembling the copper wire guide tube from the brazing trough.

Further objects and advantages of the present invention will be apparent from the following description, reference being had to the accompanying drawings wherein a preferred embodiment of the invention is clearly shown.

In the drawings:

Figs. 1 to 5 inclusive are sectional views of plies of strip steel showing the process of forming into a multi-ply tube. These views were made from photographs of cross sections of specimens of tubing taken at different stages of formation.

Fig. 6 is a sectional view similar to Fig. 5, but on a very much larger scale. Fig. 6 shows the completed tubing. The plies and seams have been filled with the brazing material.

Figs. 9A, 9B and 9C together constitute a diagram of a tubing mill including the brazing furnace of the present invention, said furnace being shown in longitudinal section.

Fig. 10 is a fragmentary cross sectional view on a vertical plane of the furnace shown in Fig. 9.

Fig. 11 is a fragmentary longitudinal sectional view of the tubing guide pipe within the brazing furnace.

Figs. 12A and 12B, drawn on separate sheets, taken together form a top plan view of the brazing tray assembly which includes the brazing trough, gas wiper and wiping gas pre-heater duct.

Figs. 13A and 13B taken together constitute a longitudinal sectional view of the tray assembly.

Figs. 14A and 14B taken together constitute a side elevation thereof drawn to a much larger scale than that appearing in Fig. 9.

Fig. 15 is a fragmentary longitudinal sectional view of the brazing tray assembly and is drawn to a larger scale than Fig. 13A.

Figs. 16, 17 and 18 are the sectional views taken respectively on the lines 16—16, 17—17 and 18—18 of Fig. 15.

Figure 1:
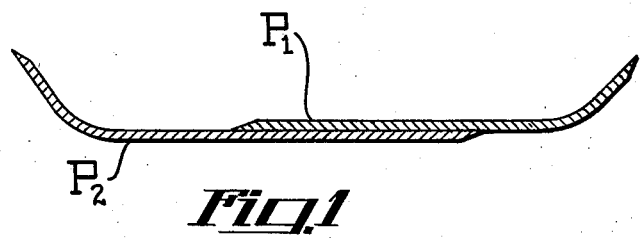
Figure 2:
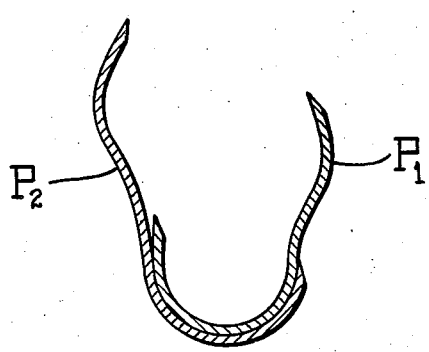
Figure 3:
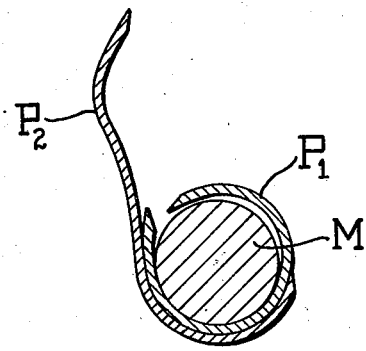
Figure 4:
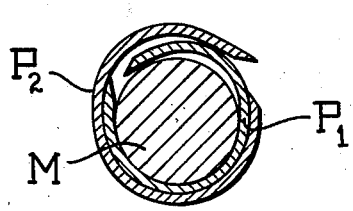

Referring to the Figs. 1 to 5, it will be seen that the tubing T comprises plies of steel $P_1$ and $P_2$ which are first overlapped and then have their remote side edges formed simultaneously into the shapes shown in Fig. 1. The plies $P_1$ and $P_2$ are simultaneously formed so as to provide substantially one-half cylindrical portions of the tubing as shown in Fig. 2. Then the inner ply $P_1$ is formed so as to provide an approximately complete inner ply as shown in Fig. 3. Then the outer ply $P_2$ is formed around the approximately complete inner ply $P_1$ as shown in Fig. 4. The steps shown in Figs. 1 to 4 are accomplished by passing the strips through a series of guides G and pairs of rollers R and about a mandrel M which form the tube-forming mill 25 shown diagrammatically in Fig. 9. The tube-forming mill is described in detail in the companion copending application of C. A. Nichols Ser. No. 199,557, filed April 2, 1938.

As shown in Fig. 9A—B—C, the plies $P_1$ and $P_2$ are unwound from supply reels $R_1$ and $R_2$ respectively. Both plies are cleaned free from any previously applied rust protecting grease by passing them through a suitable degreasing apparatus located adjacent the reels $R_1$ and $R_2$. Before the plies $P_1$ and $P_2$ pass through the tube-forming mill, that surface of the ply $P_1$ which is to form the interior wall of the tubing and that surface of the ply $P_2$ which is to form the exterior wall of the tubing are given a coat of a special lubricant which lubricates the mandrel M and rolls R of the tube-forming mill 25. The oil which is used to lubricate the plies is an oil which will form a protecting gas while the tubing is being heated in the brazing furnace so as to combine with oxygen of the air within the tubing and thus prevent oxidation of the interior of the tubing. This oil is applied by a special oiler 20 which includes wicks 21 extending upwardly from vessels of oil and urged by spring-pressed pads 22 against that surface of the ply $P_1$ which is to provide the interior wall of the finished tubing and that surface of the ply $P_2$ which is to provide the exterior wall. As the plies $P_1$ and $P_2$ pass through the oiler, the adjacent surfaces of the plies are not oiled for the reason that oiling serves no useful purpose and would be detrimental because it is desirable to minimize the quantity of oil carried into the furnace in order to prevent the carburizing effect of such oil upon the tubing.

Figure 5:
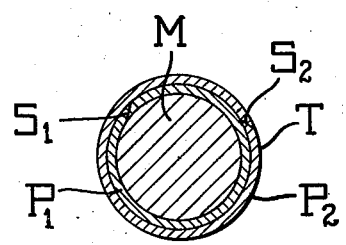
Figure 6:
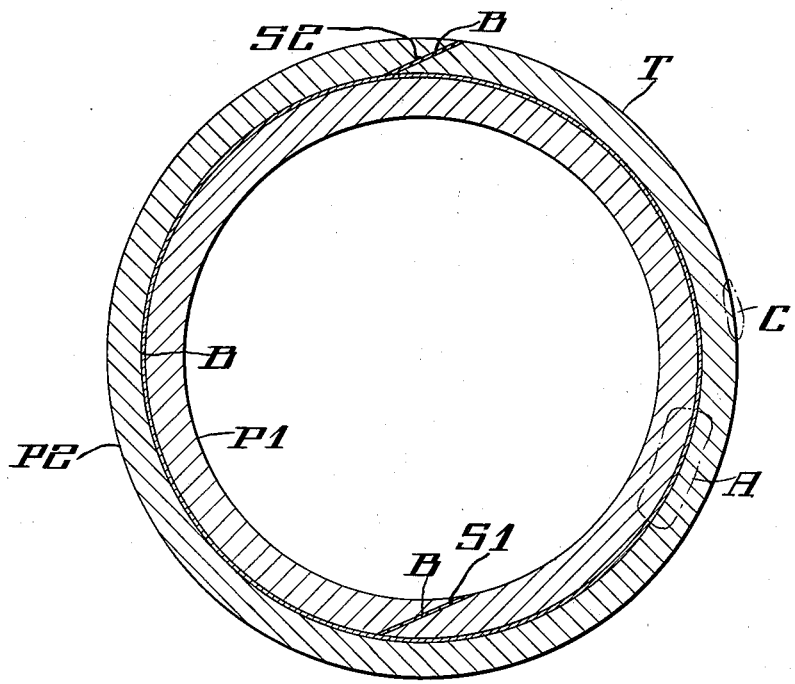

In order to bring the tubing into the condition shown in Fig. 5 it is passed through a rotary swager 26, the details of which are disclosed in the companion application referred to. For purposes of the present disclosure it is sufficient to state that the tubing, while passing longitudinally through the swager 26, is subjected to the action of a pair of dies which, while rotating around the tubing, are caused to rapidly reciprocate and pound against the exterior wall of the tubing in order to change the condition of the tubing from that shown in Fig. 4 to that shown in Fig. 5. As shown in Fig. 5 the tubing plies are substantially cylindrical and the space between the plies is reduced to the minimum, also the space at the inner seam $S_1$ and at the outer seam $S_2$. These seams $S_1$ and $S_2$ are preferably diametrically opposite each other as shown in Fig. 6. However the tubing shown in Fig. 5, in which the seams are 90° apart, is satisfactory. If, due to inaccuracies of adjustment of the tube-forming rollers and guides, these seams should come closer together than 90°, the production of the mill is not satisfactory and the rollers and guides thereof must be readjusted.

It will be noted that the seams $S_1$ and $S_2$ are oblique and are the result of scarfing the edges of the plies. These oblique or beveled seams are provided in order to make the seams of sufficient strength to allow the tubing to be flared without breaking the seams.

Figure 7:
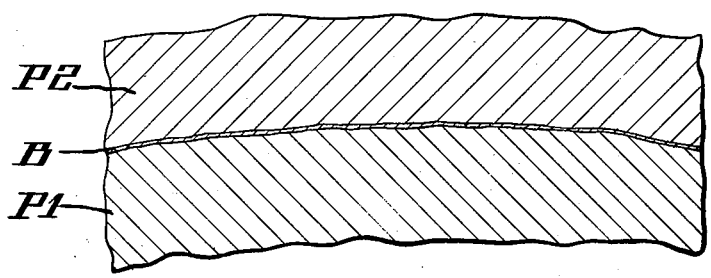
Fig. 7 is a micro-photographic illustration of a fragmentary section of the tube indicated within the dot-and-dash enclosure A of Fig. 6, Fig. 7 being on a very much larger scale than Fig. 6.

Fig. 6 shows the brazing material B occupying the minute spaces between the plies and the overlapping edges of the plies $P_1$ and $P_2$. The layer of brazing material B between the plies is exceedingly small, as will be apparent from Fig. 7 which is drawn from a microphotograph of a fragment of a cross section of a ⅜" tube enlarged 100 times. The brazing material B provides a very strong and durable bond between the plies of the tubing. The completed tubing has no copper on the interior wall because the brazing material penetrates only through to and including the seam S₁. The copper, on account of its high surface tension, will not creep along the inner surface of the tube even though there is present a gas which produces a non-oxidizing atmosphere.

Figure 8:
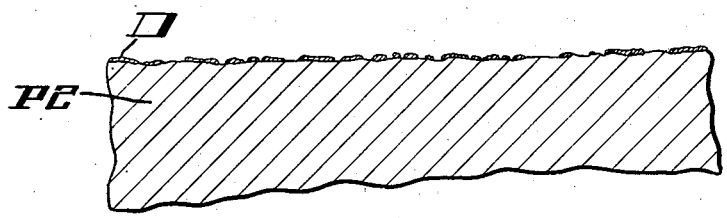
Fig. 8 is a micro-photographic illustration of a fragmentary section of the tube as indicated by the dot-and-dash enclosure C of Fig. 6, Fig. 8 being on a very much larger scale than Fig. 7.

Fig. 8 is a fragmentary section of a part of the outer ply P₂ of a ⅜″ tube enlarged 2500 times. It will be noted that the outer surface of the tubing has been wiped by the gas wiper so that it is free of any substantial accumulation of copper or other brazing material. The minute patches D are minute traces of copper which remain on the exterior of the tubing after it has passed through the gas wiper. These minute traces of copper, which merely color the tube rather than form a continuous coat thereon, have been found to accelerate, rather than resist, corrosion. For this reason the copper brazed tube is later plated with tin, zinc, cadmium, or any other suitable material, preferably by electro-deposition after the tube has been cut into the desired lengths.

The brazing of the tubing T, as represented by Fig. 6, is done in an electric furnace 30, shown in Figs. 9A—B—C, which is heated by resistance elements 31 supported on the interior of the side walls of the furnace as shown in Fig. 10. These elements are so arranged and the current passing through them is so regulated as to effect the heating of the tubing to a temperature of about 2100° F. by the time the tubing arrives at the brazing trough. Each furnace 30 is associated with two forming mills and swagers and carries two guide tubes 32 and two brazing tray assemblies 40 and two devices for feeding copper wire into the brazing troughs as shown in Fig. 10. Each guide tube 32 extends from a point just outside of the left end wall of the furnace as viewed in Figs. 9A—B—C to the brazing tray assembly 40 with which it is detachably connected. To accommodate various sizes of tubing up to ½″, the guide pipe 32 is made preferably 1″ inside diameter. Each guide tube 32 is provided with diametrically opposite rows of slots 33 and 34, as shown in Fig. 11. These slots are 3/32″ to ⅛″ wide and are 5″ long and are spaced 2″ apart. The slots 33 are staggered relative to the slots 34 in such manner that the 2″ solid part on one side is approximately in the middle of a slot on the other side. This construction gives sufficient strength to the guide pipe and allows the atmosphere of the furnace to circulate freely about the tubing and mingle with the gasified lubricating oil on the exterior of the tubing. Such gasified lubricating oil would have a carburizing effect upon the tubing, causing brittleness thereof, were it not being rapidly dissipated by causing the atmosphere of the furnace to intermingle therewith.

The atmosphere of the furnace is a gaseous mixture which is introduced through the pipe 35 near the inlet end of the furnace. This gas is generated by apparatus not shown and consists approximately of the following:

| | |
|---|---|
| $CO_2$, 5.4% maximum | $O_2$, .4% maximum |
| $CO$, 8.5% minimum | $H_2$, 10.0% minimum |
| $CH_4$, 2.5% maximum | $N_2$, remainder |

This atmosphere is a reducing agent which cleans the tubes of any oxides that would tend to prevent the copper flowing into the crevices of the seams and between the plies of the tubing.

The application of copper to the tubing is accomplished in a trough located within the brazing tray assembly 40. This assembly comprises a bottom piece or tray 41 and a trough 42 supported upon ribs 43 within the tray 41. The trough 42 carries a fire brick liner 44 which is shaped to provide the inclined sides 45 merging with straight sides 46 which are joined by an arcuate portion 47 forming the bottom of the trough. The dimensions of the liner 44 will vary with different sizes of tubing to be treated therein. A ¼″ O. D. tubing requires a space of ⅜″ between the straight sides 46 of the liner 44. This leaves 1/16″ on each side with the tubing T as it rests upon the semi-cylindrical bottom portion 47 of the liner. Heat resisting metal pins 44a extend across the trough 44 to prevent accidental bowing of the tubing T upwardly from the bottom of the trough. The left-hand or inlet end of the trough is closed by a wall 48, carrying a boss 48a, having a flared opening 49 which narrows down to a round hole 50 only slightly larger in diameter than the tubing T. Owing to the closeness of the fit of the boss 48a around the tubing T and owing to the fact that the tubing is moving toward the right away from the wall 47, very little copper in the trough escapes through the hole 50. The right or exit end of the trough liner 44 is closed by a block 52 which supports an insert 53 providing the gas wiper nozzle. Block 52 is provided with a lug 54 which fits into hole 55 provided in the bottom wall of the tray 41. The block 52 is held in position by a bar 56 which is passed through holes provided in lugs 57 integral with the tray 41. The insert 53 is provided with a stepped bore comprising a portion 58 which fits around the tubing T with a slight clearance (.015″ on the diameter for ¼″ O. D. tubing), a portion 59 which is somewhat greater in diameter than the tubing T, a portion 60 of still greater diameter and a flared portion 61. The small hole 58 centralizes the tubing T and gives direction to the gas issuing from the wiper jet. The hole 59, in conjunction with the tubing T, provides an annular channel which is connected by a hole 62a and an annular passage 62b in insert 53 which is connected with a pipe 63 through which the wiping gas enters. It is preferable to lead the wiping gas in at the bottom where the width of the annular channel is the least and the gas velocity will be greater than it would be above the tube. This is desirable since most of the copper to be wiped off collects on the under side of the tubing. This gas envelopes the tubing T and issues in the form of an annular jet, as indicated by the arrows 64. Since the insert 53 is made of relatively hard metal, it is difficult to machine a smooth conical bore therein from the left-hand end thereof to the straight hole 58. Approximately the same effect can be obtained by countersinking with drills to provide the portions 59, 60 and 61. The effect of this stepped construction is to produce eddy currents which increase the effectiveness of the gas to remove particles and drops of copper from the tubing.

Gas which is delivered to the gas wiper block 53 is preheated by passing it through a circuitous heating duct comprising an inlet pipe 70 (see Figs. 12A, 12B, 13A and 13B). Pipe 70 communicates with a central pipe 71 shown in Fig. 12A connected by a lateral pipe 72 with a side pipe 73 which is connected by lateral pipe 74 (see Fig. 12B) with a side pipe 75 which is connected as shown in Fig. 12A with the pipe 63 extending through the block 52 and communicating with the passage 62b of the wiper block 53. The gas heater pipes 71, 73 and 75 are assembled around a guide pipe 76 through which the tubing T passes after leaving the wiper block 53.

The trough liner 44 contains a bath of copper 80, the surface of which is represented by the dot-dash line 80 in Fig. 15, which is replenished with molten copper obtained by melting the end of a copper wire 81 which is fed into the brazing tray from a supply roll 82 shown in Fig. 10. The wire 81 passes between feed rolls 83 and 84 geared together by gears, not shown. The roll 84 is urged toward the roll 83 by springs 85 pressing against bearing blocks 86. The shaft 87 carrying the roll 83 is driven by a gear 88 meshing with a smaller gear 89 connected by shaft 90 and speed-reducing gear 91 with an electric motor 92. The wire 81 is guided into the furnace through a curved pipe 93 which extends into a pipe 96 which extends through a liner pipe 95 which extends through the top wall of the furnace. Pipe 96 carries a collar 96a which seals the opening in liner pipe 95. The wire 81 is guided by the pipe 96 which is supported within the liner pipe 95 and extends downwardly through a hole in a cover 97 of the brazing trough. The pipe 96 rests upon the trough liner 44. The cover 97 is welded to an apron 97a which rests upon inclined surfaces 98 of the tray 41. The copper wire 81 is preferably .129" in diameter and is fed at the rate of 12⅜" per minute for ¼" O. D. tubing.

The temperature necessary to melt the copper is 1981° F. in reducing atmosphere. In order to increase the speed at which the wire is melted and to increase the fluidity of the copper in the bath 80, the temperature of the furnace surrounding the brazing tray is approximately 2100° F., at which temperature the copper will run freely through the seams of the tube, due to capillary action. Pieces of nearly melted copper drop from the end of the wire 81 and descend along a side 46 of the trough liner 44 to the bottom thereof to supply copper to the bath 80 where the melting of the copper pieces is completed. The heated gas issuing from the wiper block 53 operates not only to wipe the tubing as clean of copper as possible, but blows against the copper bath 80 to cause it to take the form of a wave and thus to submerge the tubing T. In this way it is made certain that the copper will reach the outside seam of the tubing although that seam may be on top. While molten copper has the facility of penetrating by capillary action, it does not tend to crawl up the sides of the tubing from a lower level due to the high surface tension of the molten copper. It is therefore necessary to cause the bath 80 to pile up in the form of a wave to be sure that copper will strike the outer seam $S_2$ in case that seam should be on top.

The exact location of the bath 80 with respect to the ends of the trough liner 44 and the exact shape of the bath is not definitely known since there is no way of observing what takes place within the brazing trough during the brazing operation. However, we know that the tubing has been submerged in the bath of copper because inspection of the completed tubing shows that all portions of it have been in contact with copper since all portions show a copperish appearance, although the copper coating is nothing more than separated minute particles which have not been wiped off by the gas wiper. We have observed that, when the amount of copper in the bath is insufficient to submerge the tubing, there will be a bare streak (lacking the copperish appearance) along the top of the tubing. As the bath builds up in volume this streak diminishes in width and finally disappears when the tubing is completely submerged. Normally, very little of the copper runs out through the opening 50 in the entrance wall 48 of the trough; hence it is assumed that the copper bath 80 does not pile against the wall 48 and that the wave of the bath is spaced from the wall 48 to some extent, as indicated roughly in Fig. 15. This spacing of the wave of the bath of copper from the wall 48 is believed to be due to the fact that the tubing T, by moving relatively rapidly toward the right as viewed in Fig. 15, drags the copper of the bath along with it to some extent.

The copper in the trough is more or less agitated by the gas from the wiper and some of it may splash over the upper edge of the trough casting 42. The copper which thus splashes out is directed downwardly by the cover 97 and cover apron 97a to the bottom wall 43a of the tray 43. Copper received by the tray 43 may flow out through the holes 100 leading to a downwardly inclined broad spout 101 from which the copper drips into a basin 102 provided by the furnace bottom wall as shown in Fig. 10. The copper collected in this basin can be removed from the furnace.

The tray assembly which includes the bottom or tray 41, the trough 42 with its liner 44, the trough cover 97, the gas wiper 53 and the wiper gas preheating pipes 71, 73 and 75 and the outlet guide tube 76 are loosely assembled together and then are fixed in assembled relation by bands of wire, not shown. The assembly is made in a unit so that it can be removed from the furnace and a substitute unit replaced without cooling the furnace appreciably. The track 110 which supports the unit 40 locates the unit in line with the guide pipe 32 which, as shown in Fig. 15, is received within the conical passage 111 in a bushing 112 supported by the wall 113 of the tray 41.

After the tray assembly 40 has been thus located within the furnace and connected with the end of the inlet guide pipe 32, the outlet guide pipe 76 of the unit 40 is connected with a jumper tube 115 (see Fig. 9A—B—C) which is a common iron pipe which may be easily removed to permit the removal of the tray. This pipe 115 directs the tubing T to the cooling chamber which is provided by a water jacketed pipe 116 about 25 ft. long. Non-oxidizing gas is forced into the pipe 116 near its outlet and through the jumper tube 115, which receives gas from the outlet guide tube 76 into which some of the wiper gas flows from the wiper block 53. This gas keeps the tubing from oxidizing and darkening until it is comparatively cool. The water jacket is provided by the pipe 118 into which water goes from the pipe 119 and out through the pipe 120. After the tubing T leaves the water jacketed pipe 116 it goes through a water trough 121 providing a shelf 122 along which the tubing T passes while water trickles down over it, the water entering through the pipe 123 and flowing out through the pipe 124.

The tubing T is moved through the furnace not only by the rolls of the tube forming mill, but also by a set of pull-out rolls 130 and 131, shown diagrammatically in Fig. 9A—B—C. These rolls are geared together by gears, not shown. These pull-out rolls play an important role in the manufacture of tubing by the present process. The traction of the rolls upon the tubing should be sufficient to overcome the friction of movement of the tubing through the furnace, but not such as to cause the tubing to break within the furnace where is is very weak due to its relatively high temperature. The speed at which the rolls are driven is sufficient to prevent wrinkling or buckling of the tubing. Roll 130 is mounted on a shaft 131 driven by gear 132 meshing with a gear 133 connected by shaft 134 with an electric motor 135 through a friction-slip-clutch 136. The shaft 137 of gear 131 is mounted on a swinging frame 138 pivoted at 139. A weight 140 carried by frame 138 urges the roller 131 toward roller 130, thereby pinching the tubing T between the rollers. The gearing connecting the motor 135 with the roller shaft 131 is illustrated only diagrammatically in Fig. 9A—B—C. It will be understood that this gearing is such that the rolls 130 and 131 will be driven slightly faster than the tube travels, when the rolls are running free. When the rolls grip the tube, all of the slippage takes place in the friction clutch 136. Therefore, if the tubing should break for any reason, the loose pieces would be pulled clear of the oncoming tubing from the furnace. The speed at which the tubing moves through the furnace varies in accordance with the diameter of the tubing. For ¼" O. D. tubing the speed of the tubing is usually 18 ft. per minute, but may run as high as 22 ft. per minute with satisfactory results. In order to accommodate pull-out mechanism for various kinds of tubing, rolls of various sizes can be substituted.

As the tubing leaves the pull-out rolls 130 and 131 it is wound upon a reel 150 having a hub 151 and side plates 152 of such dimension as to form the tubing into a coil about 4" wide or thick, 28" inside diameter and 36" outside diameter. Tubing in lengths up to 1000 ft. are wound on such reels. One side plate 152 of the reel 150 is detachable so that the coiled tubing can easily be removed after the turns of the tubing have been wired together. The reel 150 is mounted on a shaft 153 connected by gears 154 and 155 with a shaft 156 connected by friction-slip-clutch 157 with an electric motor 158. The driving member of the friction clutch 157 rotates slightly faster than the maximum speed of reel rotation.

The coils of tubing are then tested by hydraulic pressure, one end of the tubing being attached to a source of oil under pressure and the other being attached to a pressure gauge. The coils that pass in the pressure test are then taken to a cut-off machine which uncoils the tube, straightens it and automatically cuts it off to the required lengths. The tubing is then plated both inside and out with tin in order to provide a protective coating.

While the embodiment of the present invention as herein disclosed constitutes a preferred form, it is to be understood that other forms might be adopted, all coming within the scope of the claims which follow.

What is claimed is as follows:

1. The method of brazing multiply tubing which consists in longitudinally moving the tubing horizontally while heating it in a non-oxidizing atmosphere to suitable brazing temperature, in so moving the tubing through a trough containing a bath of molten brazing metal also in a non-oxidizing atmosphere and in subjecting the tubing to a blast of heated non-oxidizing gas directed oppositely to the movement of the tubing in order to remove brazing material from the exterior of the tubing, the blast of gas being directed against the bath of brazing metal to cause the same to pile up thereby assuring that the tubing is removed in the brazing metal and that the brazing metal is applied to the outer seam of the tubing.

2. In the manufacture of tubing by forming flat strips into a multiply tube and bonding the seams and plies by brazing metal, the steps of oiling the inner surface of the inner strip before forming, then forming the tubing about a mandrel which is lubricated by the oil on the inner surface of the tubing, heating the tubing in a non-oxidizing atmosphere to suitable brazing temperature and brazing the seams and plies of the tubing, the oil on the interior of the tubing being converted to a gas which protects the interior of the tubing from oxidation.

3. The method of manufacturing multiply brazed tubing which consists in forming the ply strips of metal into approximate tubular shape, in compacting the plies and perfecting the tubular shape thereof in order to minimize the space between the plies and seams of the tubing and to increase capillarity thereof, in heating the tubing in a non-oxidizing atmosphere to suitable brazing temperature, in passing the tubing horizontally through a trough containing a bath of brazing material of high fluidity and surface tension which is rapidly absorbed between the plies and seams of the tubing, and in passing the tubing through a jet of heated gas blowing in a direction opposite to the direction of movement of the tubing to remove brazing metal from the exterior of the tubing, the rate of movement of the tubing being relatively high due to rapid absorption of brazing metal by capillary action and being such that the tubing drags the brazing metal along with it and away from the entrance end of the trough, the escape of brazing metal from the exit end of the trough being minimized by the jet of wiping gas, the movement of the tubing through the trough and jet of wiping gas cooperating to cause the brazing metal to pile up in the trough to assure submergence of the tubing.

4. Apparatus for brazing multiply tubing comprising a furnace for heating the tubing and the brazing metal, means for guiding the tubing horizontally through the furnace and comprising a perforated guide tube within which the tubing is heated to brazing temperature and a trough in alignment with the guide tube for containing a bath of molten brazing metal and means for supplying brazing metal to the trough.

5. Apparatus for brazing multiply tubing comprising a furnace for heating the tubing and the brazing metal, means for guiding the tubing horizontally while being heated, a horizontal trough in alignment with the tubing guiding means for containing a bath of molten brazing metal, means for minimizing the escape of brazing metal from the trough and to cause the metal to pile up as a wave therein, and means for supplying brazing metal to the trough.

6. Apparatus for brazing multiply tubing comprising a furnace for heating the tubing and the brazing metal, means for guiding the tubing horizontally while being heated, a horizontal trough in alignment with the tubing guiding means for containing a both of molten brazing metal, a gas wiper through which the tubing passes to remove brazing metal clinging to the exterior of the tubing, said gas wiper closing the exit end of the trough and blowing the brazing metal away from the exit end of the trough and causing the metal to pile up as a wave which submerges the tubing, and means for supplying brazing metal to the trough.

7. Apparatus for brazing multiply tubing comprising a furnace for heating the tubing and the brazing metal, means for guiding the tubing horizontally while being heated, a horizontal trough in alignment with the tubing guiding means for containing a bath of molten brazing metal, a gas wiper block closing the exit end of the trough, said block having a bore through which the tubing passes and having, between the trough and the first mentioned bore, a second bore of substantially larger diameter than the tubing to provide with the tubing an annular passage, a duct for leading gas into said annular passage thereby providing a blast of gas which removes brazing metal from the exterior of the tubing and is directed toward the bath of brazing metal in the trough in order to blow said metal away from the exit end of the trough and to cause it to pile up in the form of a wave which submerges the tubing, and means for supplying brazing metal to the trough.

8. Apparatus according to claim 7 in which the wiper gas enters the annular passage under the tubing.

9. In apparatus for brazing multiply tubing a brazing tray assembly adapted to be supported on the floor of the brazing furnace in alignment with tubing guiding means therein, said assembly comprising a tray, a trough lined with refractory material, and supported by the tray, a tray cover having an opening through which brazing metal is introduced into the trough, a gas wiper block supported by the tray and closing the exit end of the trough, and wiper gas preheating ducts supported by the tray and connected with the gas wiper block.

10. Apparatus for brazing multiply tubing comprising a furnace for heating the tubing and containing a trough holding a bath of molten brazing metal through which the tubing passes, a cooling chamber through which the tubing passes, and a gas wiper block connecting the cooling chamber with the trough, said block closing the exit end of the trough and directing gas mainly into the trough, some of the gas issuing from the wiper passing into the cooling chamber to protect the tubing therein.

11. The method of brazing multiply tubing which consists in longitudinally moving the tubing horizontally while heating it in a non-oxidizing atmosphere to suitable brazing temperature, in so moving the tubing through a vessel containing a bath of molten brazing metal also in a non-oxidizing atmosphere, said vessel having an exit for the tubing below the level of the brazing metal in the vessel, and in subjecting the tubing to a blast of heated non-oxidizing gas located at the exit and directed oppositely to the movement of the tubing in order to remove brazing material from the exterior of the tubing, the blast of gas being directed toward the bath of brazing metal to minimize the escape of brazing metal from the exit end of the vessel through which the tubing passes.

12. The method of manufacturing multiply brazed tubing which consists in forming the ply strips of metal into approximate tubular shape, in compacting the plies and perfecting the tubular shape thereof in order to minimize the space between the plies and seams of the tubing and to increase capillarity thereof, in heating the tubing in a non-oxidizing atmosphere to suitable brazing temperature, in passing the tubing horizontally through a vessel containing a bath of brazing material of high fluidity and surface tension which is rapidly absorbed between the plies and seams of the tubing, said vessel having an exit for the tubing below the level of the brazing metal in the vessel, and in passing the tubing through a jet of heated gas, located at the exit, blowing in a direction opposite to the direction of movement of the tubing to remove brazing metal from the exterior of the tubing, the rate of movement of the tubing being relatively high due to rapid absorption of brazing metal by capillary action and being such that the tubing drags the brazing metal along with it and away from the entrance end of the vessel, the escape of brazing metal from the exit end of the vessel being minimized by the jet of wiping gas.

13. Apparatus for brazing multiply tubing comprising a furnace for heating the tubing and the brazing metal, means for guiding the tubing horizontally while being heated, a horizontal vessel in alignment with the tubing guiding means for containing a bath of molten brazing metal, a gas wiper through which the tubing passes to remove brazing metal clinging to the exterior of the tubing, said gas wiper closing the exit end of the vessel and blowing the brazing metal away from the exit end of the vessel to minimize the escape of brazing metal from the exit end of the vessel through which the tubing passes.

14. The method of brazing multiply tubing which consists in horizontally moving the tubing through a vessel containing a bath of molten brazing metal protected from oxidation, said vessel having an exit for the tubing below the level of the brazing metal in the vessel and in subjecting the tubing as it leaves the vessel through an opening in an end wall thereof to a blast of heated non-oxidizing gas located at the exit and directed oppositely to the movement of the tubing in order to remove brazing material from the exterior of the tubing, the blast of gas being directed toward the bath of brazing metal to minimize the escape of brazing metal from the exit end of the vessel through which the tubing passes.

15. The method of manufacturing multiply brazed tubing which consists in forming the ply strips of metal into approximate tubular shape, in compacting the plies and perfecting the tubular shape thereof in order to minimize the space between the plies and seams of the tubing and to increase capillarity thereof, in passing the tubing horizontally through a vessel containing a bath of brazing material of high fluidity and surface tension which is rapidly absorbed between the plies and seams of the tubing, said vessel having an exit for the tubing below the level of the brazing metal in the vessel, and in passing the tubing through a jet of heated gas, located at the exit and blowing in a direction opposite to the direction of movement of the tubing to remove brazing metal from the exterior of the tubing, the rate of movement of the tubing being relatively high due to rapid absorption of brazing metal by capillary action and being such that the tubing drags the brazing metal along with it and away from the entrance end of the vessel, the escape of brazing metal from the exit end of the vessel being minimized by the jet of wiping gas.

16. Apparatus for brazing multiply tubing comprising a vessel for containing a bath of molten brazing metal, means for guiding tubing for horizontal movement through the brazing metal bath, the vessel having entrance and exit openings provided in opposite end walls thereof for the passage of the tubing, a gas wiper through which the tubing passes to remove brazing metal clinging to the exterior of the tubing, said gas wiper closing the exit opening of the vessel and blowing the brazing metal into the bath to minimize escape of brazing metal through the exit opening, and means for heating the vessel.

CHARLES A. NICHOLS.
RAYMOND H. BISH.